United States Patent
Whittaker et al.

(10) Patent No.: US 7,754,088 B2
(45) Date of Patent: Jul. 13, 2010

(54) PROCESS FOR THE DEWATERING OF AQUEOUS SUSPENSIONS

(75) Inventors: Tony Whittaker, Bradford (GB); Peter Norman, Liversedge (GB); Darryl Smith, Singapore (SG)

(73) Assignee: Ciba Specialty Chemicals Water Treatments LTD., Bradford (GB)

( * ) Notice: Subject to any disclaimer, the term of this patent is extended or adjusted under 35 U.S.C. 154(b) by 473 days.

(21) Appl. No.: 10/591,779

(22) PCT Filed: Feb. 28, 2005

(86) PCT No.: PCT/EP2005/002078

§ 371 (c)(1), (2), (4) Date: Sep. 6, 2006

(87) PCT Pub. No.: WO2005/095292

PCT Pub. Date: Oct. 13, 2005

(65) Prior Publication Data

US 2007/0187332 A1    Aug. 16, 2007

(30) Foreign Application Priority Data

Mar. 12, 2004   (GB) ................................. 0405506.7

(51) Int. Cl.
C02F 11/14 (2006.01)
(52) U.S. Cl. .................. 210/728; 210/734; 210/738
(58) Field of Classification Search ............ 210/734
See application file for complete search history.

(56) References Cited

U.S. PATENT DOCUMENTS

| 3,578,586 | A | * | 5/1971 | Gal et al. ............... 210/710 |
| 4,506,062 | A | * | 3/1985 | Flesher et al. .......... 526/211 |
| 4,528,321 | A | * | 7/1985 | Allen et al. ............ 524/761 |
| 4,599,379 | A | * | 7/1986 | Flesher et al. .......... 524/801 |
| 4,720,346 | A | | 1/1988 | Flesher et al. .......... 210/734 |
| 4,759,856 | A | * | 7/1988 | Farrar et al. ........... 210/734 |
| 4,840,736 | A | * | 6/1989 | Sander et al. ........... 210/727 |
| 4,861,492 | A | * | 8/1989 | Lehmkuhl et al. ........ 210/709 |
| 4,943,378 | A | * | 7/1990 | Flesher et al. .......... 210/734 |
| 5,213,693 | A | | 5/1993 | McGrow et al. ......... 210/728 |
| 5,370,800 | A | * | 12/1994 | Stevenson ............. 210/710 |
| 5,846,433 | A | | 12/1998 | Sorensen .............. 210/709 |
| 5,863,982 | A | * | 1/1999 | Huang et al. ........... 524/801 |
| 5,914,366 | A | * | 6/1999 | Cicchiello et al. ...... 524/521 |
| 6,001,920 | A | | 12/1999 | Ghafoor et al. ........ 524/500 |
| 6,031,037 | A | | 2/2000 | Ghafoor et al. ........ 524/388 |
| 6,060,164 | A | * | 5/2000 | Green et al. ........... 428/402 |
| 6,388,203 | B1 | | 5/2002 | Rinne et al. ........... 174/261 |
| 6,447,687 | B1 | * | 9/2002 | Winn et al. ............ 210/709 |
| 6,485,651 | B1 | * | 11/2002 | Branning .............. 210/702 |
| 6,805,803 | B1 | | 10/2004 | Weier et al. ........... 210/728 |
| 7,070,696 | B2 | * | 7/2006 | Weir et al. ............ 210/727 |
| 2006/0016761 | A1 | | 1/2006 | Mohammed et al. ..... 210/728 |

FOREIGN PATENT DOCUMENTS

| EP | 0 102 760 | 3/1984 |
| EP | 0 126 528 | 11/1984 |
| EP | 0 150 933 | 8/1985 |
| EP | 0 202 780 | 11/1986 |
| EP | 1 035 077 | 9/2000 |
| GB | 2 112 005 | 7/1983 |
| JP | 58139799 | 8/1983 |
| JP | 61-257300 | 11/1986 |
| JP | 63130200 | 6/1988 |
| JP | 6-343999 | 12/1994 |
| JP | 6-344000 | 12/1994 |
| JP | 10-249398 | 9/1998 |
| WO | 96/31542 | 10/1996 |
| WO | 98/31748 | 7/1998 |
| WO | 98/31749 | 7/1998 |
| WO | 9950195 | 10/1999 |
| WO | 01/05712 | 1/2001 |
| WO | 02/072482 | 9/2002 |
| WO | 02/079099 | 10/2002 |
| WO | 2004/022493 | 3/2004 |

OTHER PUBLICATIONS

English Language abstract of EP 1 035 077 from the esp@cenet web site printed Oct. 31, 2006.
Derwent abstract No. 1998-561468 for Japanese Patent 10-249398 Oct. 24, 2006.
Derwent abstract No. 1986-343211 for Japanese Patent 61-257300 (2006).
Derwent abstract No. 1995-069521[10] for Japanese Patent 6-343999 (2006).
Derwent abstract No. 1995-069522[10] for Japanese Patent 6-344000 (2006).
English Language abstract of JP 58139799 from the esp@cenet web site printed Nov. 17, 2006.
English Language abstract of JP63130200 from the esp@cenet web site printed Jun. 11, 2006.

* cited by examiner

Primary Examiner—Peter A Hruskoci
(74) Attorney, Agent, or Firm—Shiela A. Loggins

(57) ABSTRACT

A process of dewatering an aqueous suspension comprising treating the suspension with a dewatering amount of a reverse phase polymer, and subjecting the suspension to a mechanical dewatering to form a cake, characterised in that the reverse phase polymer only partially inverts to bring about flocculation and thickening of the suspension, and then fully inverts during the further dewatering to form a cake.

5 Claims, No Drawings

PROCESS FOR THE DEWATERING OF AQUEOUS SUSPENSIONS

The present invention concerns the flocculation and dewatering of aqueous suspensions to form a dewatered cake.

It is well known to apply flocculants to aqueous suspensions in order to separate solids from the suspension. For instance it is common practice to flocculate and then dewater suspensions containing either suspended solid, organic material or mineral solids. For instance it is common practice to flocculate sludges such as sewage sludge, waste waters, textile industry effluents, red mud from the Bayer Alumina process and suspensions of coal tailings etc. Flocculation is usually achieved by mixing into the suspension the flocculant, allowing the suspended particles to flocculate and then dewatering the flocculated suspension to form a dewatered cake.

In the dewatering of suspensions it is known to add a high molecular weight, water soluble polymer as a flocculant to the suspension in order to remove the liquid from the suspension and greatly increase the dry solids of the suspension. High molecular weight flocculants may be cationic, anionic, nonionic or amphoteric in nature. The choice of polymeric flocculant will largely depend upon the substrate, which is being treated. For instance it is common practice to use high molecular weight cationic flocculants to treat aqueous suspensions comprising suspended organic material, for instance sewage sludge. In paper-making it is known to use either cationic, nonionic, anionic or amphoteric flocculants. Flocculation of mineral suspensions is frequently effected by use of anionic flocculants.

It is standard practice to apply polymers as aqueous compositions to flocculate suspensions containing suspended organic material. Generally the compositions of polymers are relatively dilute, for instance no more than 1% and usually no more than 0.5%, and can be as low as 0.2% by weight or lower.

Various alternative methods of introducing a flocculant into a suspension have been proposed. WO-A-02/079099 describes in a method in which at least one flocculant emulsion and is added directly to a solids liquid separation process and inverted in situ such that flocculant is released directly into the application. The emulsion is added specifically at the solids liquid separation process and subjected to an effective amount of high shear for sufficient time and pressure to ensure rapid inversion of the emulsion in and complete release of the flocculant before any initial separation.

WO-A-98/31749 and WO-A-98/31748 are both concerned with preparing dispersions of high intrinsic viscosity cationic polymers in an aqueous and medium containing dissolved low intrinsic viscosity cationic polymer. The product thus formed is an aqueous dispersion of undissolved high intrinsic viscosity cationic polymer which is a convenient way of providing high molecular weight flocculants. The dispersion polymer can be dissolved in water to a conventional concentration or can be added directly to a suspension.

It is also known to use two different polymeric flocculants in the same process. In commercial practice the dewatering of sewage sludge may involve the addition of two polymeric flocculants which have the same charge (co-ionic). In other processes it is known to apply two polymers of opposite charge (counter-ionic). Where two polymeric flocculants are applied to an aqueous suspension they may be added simultaneously or more usually sequentially.

WO-A-01/05712 reveals a process of dewatering a suspension by adding to the suspension concentrated and a dilute solution of polymeric flocculants substantially simultaneously. Both the concentrated and diluted solutions of polymer are added at conventional concentrations of no more than 1% and usually much less than this.

WO-A-02/72482 describes a process of flocculating and dewatering an aqueous suspension of suspended solids in which a polymer composition comprising 40% and 60% by weight polymer and a polymer composition comprising between 0.05 and 0.2% by weight polymer are introduced simultaneously. Although the process brings about some improvements in filtration and free drainage, it would be desirable to improve upon the cake solids obtained in dewatering suspensions, especially for sewage sludges.

International application PCT/EP03/09381, unpublished at the priority date of the present application, describes a method of dewatering a suspension employing a composition comprising a cationic polymer flocculant and a coagulant in which the coagulant is encapsulated. After free drainage of the suspension the coagulant is released into the suspension for example by rupturing of the capsules which enclose the coagulant or by migration from a matrix in which the coagulant is entrapped. Although significant improvements in cake solids can be obtained in it would be desirable to provide equivalent or improved cake solids using flocculent products that can be more easily manufactured and/or applied.

However, achieving high cake solids can sometimes be difficult, particularly in the dewatering of sewage sludges. It is also known to add a flocculent or coagulant to assist the initial dewatering of a suspension followed by further addition of flocculant or coagulant and then further dewatering to achieve high cake solids. Such processes are described in JP-A-10-249398, JP-A-61-257300, JP-A-06-343999, JP-A-06-344000 and EP-A-1035077. However, these processes have the disadvantage that they require two stages of dewatering involving two separate treatments with flocculant.

It would be desirable to provide an improved process that results in dewatering of suspensions to provide increased cake solids. In particular it would be desirable to provide such a process that involves treatment agents that can be more easily and conveniently manufactured and applied. A further objective of the present invention is to provide a process that avoids the necessity of employing flocculent additions in two separate steps.

In all the aforementioned disclosures the objective is for all polymer to be fully dissolved and distributed throughout the bulk suspension before any initial separation.

According to the present invention we provide a process of dewatering an aqueous suspension comprising treating the suspension with a dewatering amount of a reverse phase polymer, and subjecting the suspension to a mechanical dewatering to form a cake, characterised in that the reverse phase polymer only partially inverts to bring about flocculation and thickening of the suspension, and then fully inverts during further mechanical dewatering resulting in further dewatering of the suspension.

The reverse phase polymer may be used in conjunction with other chemical dewatering treatments. These chemical dewatering treatments may for instance be conventional flocculating agents such as cationic polyacrylamides or conventional coagulant such as polyamines or PolyDADMACs. Such chemical treatment agents may be added before the reverse phase emulsion, or after and can be added simultaneously with it.

Although other chemical treatment agents can be added in the process it is preferred that the reverse phase polymer is the sole chemical dewatering treatment aid.

The invention is applicable to any suitable suspensions in which it is desirable to concentrate the suspended solids. This includes waste waters, textile industry effluents, mineral suspensions such as red mud from the Bayer Alumina process or coal tailings, in paper mill wastes such as cellulosic sludges. The process is particularly applicable to the dewatering of sewage sludge.

The reverse phase emulsion should be added such that partial inversion of the emulsion occurs, prior to the mechanical dewatering, to bring about initial thickening of the suspension, and then the emulsion should fully invert and bring about further dewatering of the thickened suspension. By partial inversion of the emulsion we mean that at least some of the polymer contained in the emulsion is released and dissolves. It is important that sufficient of the polymer is released in order to bring about initial flocculation and thickening of the suspension. For instance the amount of polymer released may be between 10 and 70% by the weight of polymer contained in the emulsion. Often the amount of polymer released will be between 20 and 60% and preferably this will be between 40 and 60%.

In the dewatering process the suspension is first thickened by the action of polymer released during partial inversion of the emulsion. Typically the emulsion is added to the initial bulk suspension. This stage involves the initial flocculation and release of free water to produce the thickened suspension. Generally the release of free water may be achieved by free drainage or filtration and it is common to employ mechanical means such as a belt thickener or rotary drum thickener. The reverse phase emulsion flocculant should be added in sufficient quantity to bring about initial flocculation and partial dewatering of the suspension. Preferably the suspension is thickened to produce a semi solid sludge paste.

The dewatering process involves the action of the remainder of the polymer flocculent released from the emulsion as the emulsion fully inverts on the thickened suspension The released polymer can be easily mixed into the thickened suspension and distributed throughout using conventional mixing equipment. Suitable mixing equipment includes for instance ribbon type mixers or kneading mixers. Ribbon type mixers consist of helical or spiral mixing blades that sweep across nearly the entire surface of the mixing vessel. Kneading mixers consist of two kneading arms that Intermesh as well as form a close tolerance to the mixer wall. Alternatively a second flocculant can be distributed throughout the thickened sludge during mechanical dewatering. Typically, this mechanical dewatering will involve compression and can for instance be any of belt press, filter press, screw press or centrifuge. When this treated thickened suspension is subjected to mechanical dewatering unexpectedly high cake solids can be achieved.

The reverse phase polymer may be any conventional reverse phase emulsion, reverse phase polymer dispersion or microemulsion. It may be prepared by reverse phase polymerisation or by dispersing formed polymer into a water immiscible liquid. The polymer may be any suitable natural or synthetic polymeric flocculent and typically will be high molecular weight. Natural polymers include for instance cationic starch, anionic starch and chitosan etc. Synthetic polymers and include linear, branched and cross-linked polymers of ethylenically unsaturated monomers. Usually the polymer will be of molecular weight in excess of 500,000, usually at least one million and normally 5 million up to 30 million.

The reverse phase polymer of the present invention may be cationic, anionic, nonionic or amphoteric in nature. The choice of polymeric flocculant will largely depend upon substrate, which is being treated. For instance it is common practice to use high molecular weight cationic flocculants to treat aqueous suspensions comprising suspended organic material, for instance sewage sludge. In treating paper-mill waste it is known to use either cationic, nonionic, anionic or amphoteric flocculants. Flocculation of mineral suspensions is frequently effected by use of anionic flocculants.

The polymer may be prepared by polymerisation of a water soluble monomer or water soluble monomer blend. By water soluble we mean that the water soluble monomer or water soluble monomer blend has a solubility in water of at least 5 g in 100 ml of water. The polymer may be prepared conveniently by any suitable polymerisation process.

When the water soluble polymer is nonionic the polymer may be formed from one or more water soluble ethylenically unsaturated nonionic monomers, for instance acrylamide, methacrylamide, hydroxyethyl acrylate, N-vinylpyrrolidone. Preferably the polymer is formed from acrylamide.

When the water soluble polymer is anionic the polymer is formed from one or more ethylenically unsaturated anionic monomers or a blend of one or more anionic monomers with one or more of the nonionic monomers referred to previously. The anionic monomers are for instance acrylic acid, methacrylic acid, maleic acid, crotonic acid, itaconic acid, vinylsulphonic acid, allyl sulphonic acid, 2-acrylamido-2-methylpropane sulphonic acid and salts thereof. A preferred polymer is the copolymer of sodium acrylate with acrylamide.

Preferably the water soluble polymer is cationic and is formed from one or more ethylenically unsaturated cationic monomers optionally with one or more of the nonionic monomers referred to herein. The cationic polymer may also be amphoteric provided that there are predominantly more cationic groups than anionic groups. The cationic monomers include dialkylamino alkyl (meth) acrylates, dialkylamino alkyl (meth) acrylamides, including acid addition and quaternary ammonium salts thereof, diallyl dimethyl ammonium chloride. Preferred cationic monomers include the methyl chloride quaternary ammonium salts of dimethylamino ethyl acrylate and dimethyl aminoethyl methacrylate. A particularly preferred polymer includes the copolymer of acrylamide with the methyl chloride quaternary ammonium salts of dimethylamino ethyl acrylate.

The polymers may be linear in that they have been prepared substantially in the absence of branching or cross-linking agent. Alternatively the polymers can be branched or cross-linked, for example as in EP-A-202780.

Desirably the polymer may be prepared by reverse phase emulsion polymerisation, optionally followed by azeotropic dehydration to form a dispersion of polymer particles in oil. Thus the reverse phase polymer is a water in oil emulsion or a substantially and dehydrated polymer in oil dispersion.

The polymers may be produced as a water-in-oil emulsion or dispersion by water-in-oil emulsion polymerisation, for example according to a process defined by EP-A-150933, EP-A-102760 or EP-A-126528.

It is particularly preferred that the reverse phase polymer flocculant is formed from at least 30% by weight cationic monomer or monomers. Even more preferred are polymers comprising at least 40 or 50% by weight cationic monomer units. It may be desirable to employ cationic polymers having very high cationicities, for instance up to 80 or even 100% cationic monomer units. It is especially preferred when the cationic second flocculent polymer is selected from the group consisting of cationic polyacrylamides, polymers of dialkyl diallyl ammonium chloride, dialkyl amino alkyl (meth)-acrylates (or salts thereof) and dialkyl amino alkyl (meth)-acrylamides (or salts thereof).

As stated previously the reverse phase polymer flocculant is desirably of relatively high molecular weight. Normally it will be a polymer that exhibits an intrinsic viscosity of at least 0.5 dl/g. Typically the intrinsic viscosity will be the least 3 dl/g, and often it can be as high as 20 or 30 dl/g but preferably will be between 4 and 10 dl/g.

Intrinsic viscosity of polymers may be determined by preparing an aqueous solution of the polymer (0.5-1% w/w) based on the active content of the polymer. 2 g of this 0.5-1% polymer solution is diluted to 100 ml in a volumetric flask with 50 ml of 2M sodium chloride solution that is buffered to pH 7.0 (using 1.56 g sodium dihydrogen phosphate and 32.26 g disodium hydrogen phosphate per litre of deionised water) and the whole is diluted to the 100 ml mark with deionised water. The intrinsic viscosity of the polymers are measured using a Number 1 suspended level viscometer at 25° C. in 1M buffered salt solution. One particularly useful cationic polymer type includes 50 to 100% by weight methyl chloride quaternary ammonium salt of dimethyl amino ethyl (meth) acrylate and 0 to 50% by weight acrylamide of intrinsic viscosity between 4 and 10 dl/g. Preferably the cationic polymer comprises at least 80% methyl chloride quaternary ammonium salt of dimethyl amino ethyl (meth) acrylate.

Other suitable reverse phase polymeric flocculants include polyvinyl amidine and polyvinyl amines of intrinsic viscosity greater than 1 dl/g, preferably greater than 2 dl/g.

Another particularly suitable category of reverse phase polymeric flocculants are Mannich addition polyacrylamides. Ideally such polymers will exhibit an intrinsic viscosity greater than 1 dl/g and quite often can be at least 4 dl/g, for instance at least 7 or 8 dl/g. Such polymers may be made by reacting formaldehyde/amine adducts with polyacrylamide. The amine may for instance be dimethylamine or other secondary amines. Preferably the Mannich addition polyacrylamides are quaternised salts and these could be prepared by reacting the free base Mannich with a suitable quaternising agent such as methyl chloride or dimethyl sulfate.

Another suitable polymer as the reverse phase polymer includes poly dimethyl diallyl ammonium chloride of intrinsic viscosity greater than 0.5 dl/g, preferably at least 1 dl/g.

Effective dewatering of suspensions can be achieved when these polymers are used in accordance with the present invention.

Typically the dose of the polymer found to be an effective dewatering amount is often at least 50 mg active polymer per litre of suspension. Usually the amount would be higher for instance up to 400 mg per litre or higher. Preferred doses are between 60 and 350 mg per litre.

The following example is an illustration of the invention.

EXAMPLE

Dewatering of Aqueous Suspensions via Direct Addition of a Dehydrated Emulsion (Liquid Dispersion Product) Organic Polymer Flocculant Polymer Polymer A is a linear, high molecular weight, high cationic acrylamide based polymer of intrinsic viscosity 9 dl/g in the form of a dehydrated emulsion (liquid dispersion product).

Unless otherwise stated intrinsic viscosity is measured using a Number 1 suspended level viscometer, in 1M sodium chloride buffered to pH 7 in accordance with the information given in the description.

Test Substrate

Dewatering tests were conducted on a sample of a digested, mixed primary/activated sludge. The sample had a dry solids content of 1.9%.

Experimental Procedure (A) Addition of neat or solution of polymer A i) A portion of Polymer A was first dissolved in deionised water to give a homogeneous 1% w/v solution based on active polymer and further diluted to 0.25% w/v prior to use. The 1% w/v solution was further diluted with deionised water to 0.25% w/v prior to use.

ii) 500 ml of a digested, mixed primary/activated sludge was placed in a 1 litre plastic beaker (120 cm diameter by 120 cm tall). A standard laboratory stirrer was secured over the beaker with the stirrer shaft located through a hole in the centre of the beaker lid. The stirrer is a four bladed, flat crosshead type (each paddle is 25 cm width by 1.1 cm).

iii) An appropriate volume of either neat Polymer A, or a 0.25% solution of Polymer A, was added to the sludge and the lid secured to the beaker. The sludge was flocculated by stirring at 1500 rpm for 15 s. The flocculated sludge was poured into a filtration cell, which had a filter membrane, comprising an 8 cm diameter belt-press filter cloth and the filtrate collected in a measuring cylinder.

iv) After 30 s drainage the thickened sludge retained on the filter cloth was subjected to a 'furrowing' technique, whereby a spatula was slowly drawn across the sludge in several directions to encourage release of more water. Furrowing was carried out for 30 s. The volume of filtrate was noted.

v) The thickened sludge was transferred to a 250 ml beaker and stirred by hand for 45 s with a spatula, using a slow, circular folding action.

vi) The thickened sludge was then transferred to a piston-press device and subjected to a compression dewatering stage. Dewatering was commenced using a pressure of 20 psi for 2 minutes, followed by increases of 10 psi, at one minute intervals, for a further 3 minutes to a maximum of 60 psi. Pressure was maintained at 60 psi for a further 5 minutes, giving a total compression dewatering time of 10 minutes. The wet cake was removed and the cake solids content was determined by heating at 110° C. overnight.

(B) Addition of neat or solution of polymer A excluding mixing of the thickened sludge.

The procedure was exactly the same as that described in Procedure (A) except:

Section i)—An appropriate volume of a 0.25% solution of Polymer A was added to the sludge and the lid secured to the beaker. The sludge was flocculated by stirring at 1500 rpm for 15 s. The flocculated sludge was poured into a filtration cell, which had a filter membrane, comprising an 8 cm diameter belt-press filter cloth and the filtrate collected in a measuring cylinder.

Section v)—this section was omitted.

Results

The results are given in Table 1

TABLE 1

| Data Set | Test Procedure | Neat Polymer A Dose (mg/l) | 0.25% w/v Polymer A Dose (mg/l) | Filtrate Volume (ml) | Cake solids(%) |
|---|---|---|---|---|---|
| 1 | A | 200 | — | 430 | 23.39 |
|   |   | 250 | — | 415 | 25.65 |
|   |   | 300 | — | 405 | 27.57 |
| 2 | A | — | 200 | 460 | 16.15 |
|   |   | — | 250 | 470 | 16.55 |
|   |   | — | 300 | 480 | 19.67 |
| 3 | B | 200 | — | 460 | 20.24 |
|   |   | 250 | — | 465 | 20.34 |
|   |   | 300 | — | 470 | 22.33 |

The above results show the improved cake solids obtained when Polymer A is added as the neat product compared to adding as a conventional dilute solution.

Comparison of data sets 2 and 3 show that additional mixing of the thickened polymer treated sludge is detrimental to cake solids.

The invention claimed is:

1. A process of dewatering an aqueous suspension of sewage sludge comprising
   a) treating the suspension with a dewatering amount of a reverse phase polymer which is a substantially dehydrated polymer in oil dispersion of polymer particles in oil,
   in which the reverse phase polymer only partially inverts releasing sufficient polymer to bring about flocculation and thickening of the suspension, involving the release of free water to produce a thickened suspension, wherein the release of free water is achieved by free drainage or filtration,
   b) the remainder of the polymer is released from the reverse phase polymer as the reverse phase polymer fully inverts in the thickened suspension,
   c) the polymer released in step b) is mixed using mixing equipment into and distributed throughout the thickened suspension
   and
   d) the thickened suspension is subjected to mechanical compression dewatering to form a cake,
   wherein the reverse phase polymer has an IV of at least 3 dL/g and which polymer is a cationic polymer including 50 to 100% by weight methyl chloride quaternary ammonium salt of dimethyl amino ethyl (meth)acrylate and 0 to 50% by weight acrylamide.

2. A process according to claim 1 in which the reverse phase polymer is the sole chemical dewatering treatment aid.

3. A process according to claim 1 in which the mechanical dewatering employs an apparatus selected from the group consisting of belt press, filter press, screw press and centrifuge.

4. A process according to claim 1 in which the polymer is a polymer formed from 50 to 100% by weight methyl chloride quaternary ammonium salt of dimethyl amino ethyl (meth)acrylate and 0 to 20% by weight acrylamide of intrinsic viscosity between 4 and 10 dl/g.

5. The process according to claim 1, wherein the reverse phase polymer is an 80 to 100% by weight methyl chloride quaternary ammonium salt of dimethyl amino ethyl (meth)acrylate.

* * * * *